United States Patent [19]
Dougherty

[11] Patent Number: 5,549,984
[45] Date of Patent: Aug. 27, 1996

[54] CONTROL AND INDICATOR CIRCUIT FOR A DUAL BATTERY SYSTEM

[75] Inventor: Thomas J. Dougherty, Waukesha, Wis.

[73] Assignee: Globe-Union Inc., Milwaukee, Wis.

[21] Appl. No.: 280,053

[22] Filed: Jul. 25, 1994

[51] Int. Cl.6 .................................................. H01M 2/00
[52] U.S. Cl. ............................. 429/61; 429/90; 429/93; 429/9; 324/765; 324/769; 324/771; 307/10.7; 340/636
[58] Field of Search .................................. 429/61, 90, 93, 429/9; 307/10.7; 340/635, 636; 324/765, 769, 771

[56] References Cited

U.S. PATENT DOCUMENTS

| | | | |
|---|---|---|---|
| 5,002,840 | 3/1991 | Klebenow et al. | 429/9 |
| 5,153,449 | 10/1992 | Crook et al. | 307/66 |
| 5,162,164 | 11/1992 | Dougherty et al. | 429/9 |
| 5,316,868 | 5/1994 | Dougherty et al. | 429/9 |

*Primary Examiner*—Bruce F. Bell
*Attorney, Agent, or Firm*—Harness, Dickey & Pierce, P.L.C.

[57] ABSTRACT

A dual battery or back-up battery system includes a control and indicator circuit for driving the battery switch. The battery switch is coupled between the positive terminals of the primary battery and auxiliary battery. The control and indicator circuit includes an indicator such as an LED, an indicator switch such as a single pole, single throw switch, and a driver circuit. The driver circuit includes a voltage tripler for appropriately driving a MOSFET battery switch. The indicator requires only a single signal conductor between the driver circuit and the indicator switch or indicator light. The indicator switch may also be utilized to provide a signal to a computer or other control circuit. The indicator switch and indicator are advantageously located within the interior of an automobile so that the operator may easily monitor and control the battery switch.

6 Claims, 1 Drawing Sheet

CONTROL AND INDICATOR CIRCUIT FOR A DUAL BATTERY SYSTEM

CROSS REFERENCED TO RELATED APPLICATIONS

The present application is related to U.S. Pat. No. 5,316,868, filed Jul. 21, 1992, entitled "Dual Battery Switch Circuit," U.S. Pat. No. 5,162,164, filed Nov. 15, 1990, entitled "Dual Battery System," and U.S. Pat. No. 5,002,840, filed Jun. 12, 1989, entitled "Switched Emergency Battery System," all assigned to the assignee of the present invention.

TECHNICAL FIELD

The present invention relates generally to a battery backup or "dual battery" system and, more particularly to a control circuit for switching between the battery switch in a dual battery system.

BACKGROUND OF THE INVENTION

Battery backup or dual battery systems generally include a primary (main) battery and an auxiliary battery. The auxiliary or reserve battery is useful in vehicular battery systems because the auxiliary battery can supply necessary power when the primary battery is drained or malfunctioning. Also, the auxiliary battery can augment the primary battery for high current demand applications or during adverse environmental conditions such as drastically cold weather.

The primary battery and auxiliary battery may be provided in an integrated package as shown in U.S. Pat. No. 5,162,164 or as two separate battery units. The positive terminals of the primary battery and auxiliary battery are coupled together through a manual battery switch. The manual battery switch engages the auxiliary battery when it is in a closed position (conducting state). In vehicular battery systems, the manual battery switch is often located within the integrated battery package, in the engine compartment, under the hood, or proximate some other undesirable place.

Generally, operators of vehicles are not provided any indicia of the state of the manual battery switch or a remote switch to control the battery switch. The state of the battery switch is indicative of whether the auxiliary battery is being engaged. Often, control circuits require a circuit to drive the indicator so that it emits light and a separate circuit to drive the battery switch. Such circuits often require a double pole, single throw (or more complex) switch. However, double pole, single throw switches are more expensive and more difficult to implement because two signal conductors (besides the power and ground conductors) must be coupled to the switch. In vehicular battery systems, each signal wire adds to the manufacturing cost of the vehicle and the potential for defects.

Thus, there is a need for a dual battery system which utilizes an annunciator or indicator as both a circuit element for driving the battery switch and device for providing indicia of the condition of the battery switch. More particularly, there is a need for an indicator and control circuit which utilizes a single pole, single throw switch. The indicator and control circuit should have a low parts count, be highly reliable, and require only a single conductor to connect to the manual switch.

SUMMARY OF THE INVENTION

The present invention relates to a switch control circuit for a battery back-up system including a first battery and a second battery. The first battery and second battery have positive terminals coupled to a battery switch which has a control input. The switch control circuit includes an indicator, a threshold circuit and a control circuit. The control circuit has a first input, a second input, and an output. The first input is coupled to the light indicator, and the second input is coupled to the threshold circuit. The output is coupled to the control input of the battery switch. The control circuit provides a control signal when a first signal at the first input is in a predetermined relationship with a second signal at the second input.

The present invention also relates to an indicator circuit for a vehicular battery system. The vehicular battery system includes a first battery and a second battery. The first battery and second battery have positive terminals coupled to a battery switch having a control input. The battery switch is located proximate the first and second battery. The indicator circuit includes an indicator located in the interior of the vehicle, an indicator switch coupled to the indicator also located in the interior of the vehicle, a single signal conductor coupled to the indicator switch, and a driver circuit. The driver circuit has an input coupled to the single signal conductor, and an output coupled to the control input of the battery switch. The driver circuit provides a control signal at the output when the switch is in a first position.

The present invention further relates to a dual battery system for an automobile including a first battery, a second battery, a field effect transistor ("FET") switch, an indicator, and a control means. The FET has a drain coupled to the positive terminal of the first battery and a source coupled to the positive terminal of the second battery. The FET switch also has a gate. The negative terminals of the first and second batteries are coupled together. The control means has an input electrically communicating with the indicator and an output electrically communicating with the gate. The control means provides the control signal when the indicator is emitting light.

In one aspect of the present invention, the control circuit utilizes a single pole, single throw switch coupled in series with a light emitting diode ("LED") or other indicator light for driving the battery switch. In another aspect of the present invention, the control circuit includes a comparator for driving the battery switch. The comparator is coupled to the indicator and advantageously provides a convenient design for virtually any configuration of the battery switch or dual battery system.

In yet another aspect of the present invention, the battery switch is a semiconductor switch such as a metal oxide semiconductor field effect transistor (MOSFET) which has conductive properties that are well suited for the battery switch application. For example, the MOSFET should have a very low voltage drop when the switch is turned ON and yet prevent electrical communication between the drain and source when gated off. In still another aspect of the present invention, the control circuit includes a voltage tripler which drives the MOSFET over the wide operating voltage range of the dual battery system as the system experiences maximum current loads such as when starting the engine of the vehicle.

The control and indicator circuit of the present invention allows an operator of a vehicle to engage and disengage the auxiliary battery and monitor the state of the battery switch while in the interior of the vehicle. The circuit advantageously utilizes only a single outside connection to an indicator switch. The circuit also advantageously utilizes an LED as both an annunciator and a circuit element which operatively contributes to the function of the control circuit.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENT OF THE PRESENT INVENTION

Figure 1:
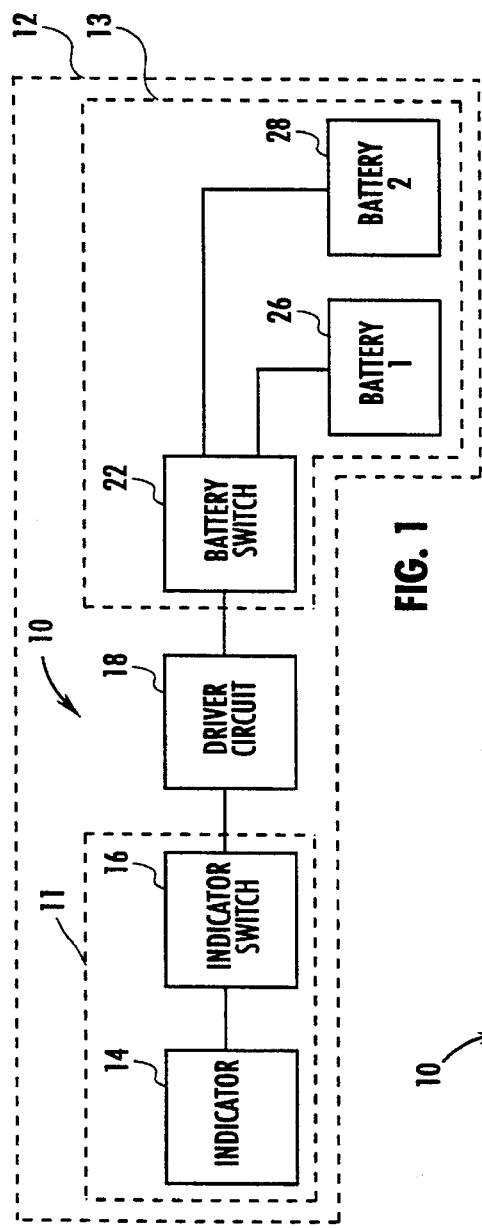
FIG. 1 is a schematic block diagram of a dual battery system employing an exemplary embodiment of the present invention.

FIG. 1 is a schematic block diagram of a battery backup or dual battery system 10 for a vehicle 12 such as an automobile. System 10 includes an indicator 14, a switch 16, a control or driver circuit 18, a battery switch 22, a first battery 26, and a second battery 28. Indicator 14 is coupled to indicator switch 16 which is coupled to driver circuit 18. Driver circuit 18 is coupled to battery switch 22. Battery switch 22 is coupled between the positive terminals of batteries 26 and 28.

Batteries 26 and 28 are located in an engine compartment 13 and may be part of a dual lead acid battery as described in U.S. Pat. No. 5,002,840 or may be two separate batteries of the same or different voltage and types. For some automotive applications, it may be advantageous to use 12 volt (V) and a higher voltage battery such as a 24 V or 48 V batteries, the latter being provided with a converter to convert the 24 V or 48 V battery output to 12 V when needed.

Indicator 14 is an annunciator or device for providing indicia of the state of battery switch 22. For example, indicator 14 may be the speaker or other audio circuit which provides a buzz or other sound when battery switch 22 is opened or closed. Alternatively, indicator 14 may be an LED or incandescent lamp which emits light when battery switch 22 is opened or closed.

Indicator switch 16 is preferably a manual switch such as a push button. Preferably, indicator switch 16 is a single pole, single throw switch requiring only one signal connection to driver circuit 18 and indicator 14. Indicator 14 and indicator switch 16 are located in an operator compartment 11 (the interior) of vehicle 12 such as the dashboard so that they may be easily manipulated and viewed by the driver of the vehicle. Thus, indicator 14, indicator switch 16, and driver circuit 18 cooperate to provide a control and indicator circuit for battery switch 22.

Alternatively, indicator switch 16 may be a semiconductor switch or relay switch which is controlled by an automatic battery backup circuit (not shown) (similar to those described in U.S. Pat. No. 5,316,868). The automatic battery backup circuit closes or opens indicator switch 16 in response to voltages across a primary battery such as battery 26. For example, when battery 26 is depleted of operating power, the automatic battery backup circuit senses the lack of power in battery 26 and closes indicator switch 16 so that a secondary battery such as battery 28 is coupled to the electrical system of the vehicle.

Driver circuit 18 preferably senses the state of indicator switch 16 and drives battery switch 22 in accordance with that state. For example, when indicator switch 16 is closed and indicator light 14 emits light, driver circuit 18 closes battery switch 22. Driver circuit 18 receives a low voltage, low power signal from indicator switch 16 and drives battery switch 22 with a higher voltage signal. Driver circuit 18 may provide isolation between indicator switch 16 and battery switch 22 to protect electrical components and the operator in the vehicle.

Driver circuit 18 is designed to provide the appropriate drive signal for the particular type of battery switch 22 which is employed. Battery switch 22 may be a mechanical relay switch or a semiconductor switch. Preferably, battery switch 22 is a MOSFET switch such as the MOSFET described in U.S. Pat. No. 5,316,868. Preferably, battery switch 22 is closed or conducting when driver circuit 18 provides the drive signal as a logic high or a 12 V signal for battery switch 22. Driving battery switch 22 with a logic high prevents wasted energy when battery 28 is not engaged. Battery switch 22 is located within engine compartment 13 and proximate batteries 26 and 28 in order to minimize the length of conductors between batteries 26 and 28. Alternatively, battery 28 is located in a trunk (not shown) of vehicle 12.

In operation, when the operator of the vehicle or automatic back up circuit determines that battery 26 is worn down or not operating properly and battery 28 should be engaged, the operator or automatic circuit closes indicator switch 16. When indicator switch 16 is closed, indicator 14 provides indicia that battery 28 has been engaged. Driver circuit 18 receives the signal from indicator switch 16 and drives battery switch 22 to a conducting or closed state. When battery switch 22 is in a closed state, the positive terminals of battery 26 and battery 28 are coupled together. When the positive terminals of battery 26 and battery 28 are coupled together, battery 26 is engaged in the electrical system of the vehicle. Preferably, driver circuit 18 drives the battery switch with a signal having a voltage at least 10 volts higher than the voltage at the positive terminals of batteries 26 and 28. For example, in a typical automotive battery system, battery 26 and battery 28 have a voltage between 12 V and 14 V at their positive terminals. Driver circuit 18 must provide a voltage of at least 24 volts to ensure that battery switch 22 is driven to a conducting state.

Figure 2:
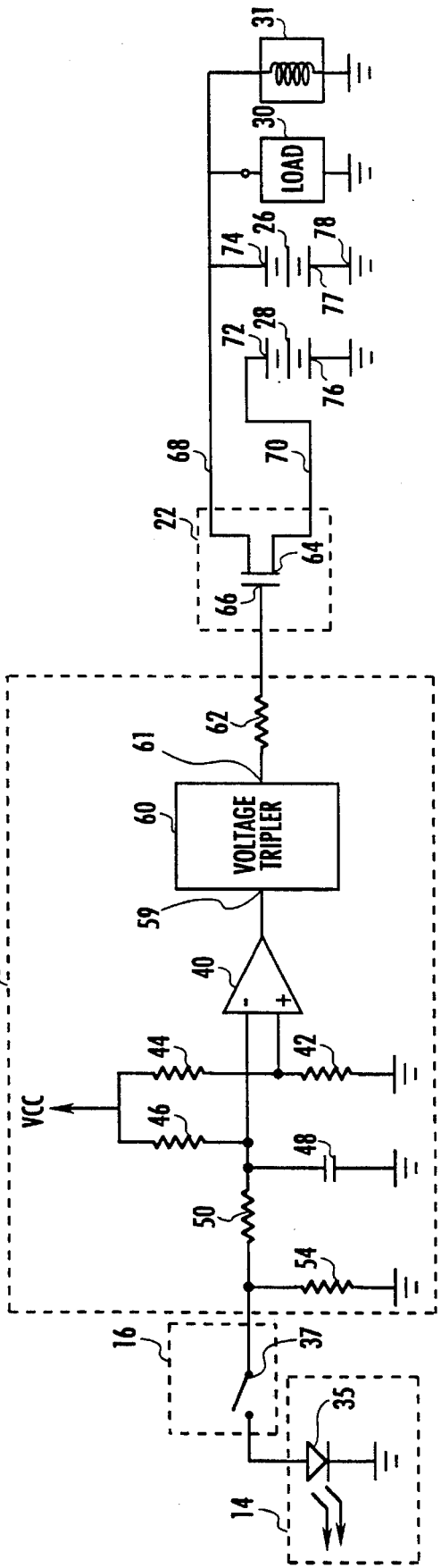
FIG. 2 is a more detailed electrical schematic drawing of the dual battery system illustrated in FIG. 1.

With reference to FIG. 2, dual battery system 10 includes the illustrated components of indicator 14, indicator switch 16, driver circuit 18, battery switch 22, battery 26, and battery 28. Driver circuit 18 and battery switch 22 may be advantageously implemented in a form such as that described in U.S. Pat. No. 5,153,449 to provide superior heat dissipation in a compact package. Indicator 14 includes an LED 35 such as a Lee Craft L111CR. LED 35 may be replaced by a incandescent light such as a dashboard light or other indicator having an approximately 1.2 volt to 2 volt threshold for emitting light at 20 milliamps. Indicator switch 16 includes a single pole, single throw switch 37 such as a Carlingswitch V15AB10C.

Driver circuit 18 includes a comparator 40, a resistor 42, a resistor 44, a resistor 46, a capacitor 48, a resistor 50, a resistor 54, a voltage tripler 60, and a resistor 62. Comparator 40 is preferably a 741 operational amplifier or other CMOS device configured as a comparator. Resistors 42, 44 and 46 have values of 10K, 10K and 1K, respectively. Resistor 50 has a value of 300Ω, resistor 54 has a value of 1M, and resistor 62 has a value of 30Ω. Capacitor 48 has a value of 0.1 uF. A first end of resistor 42, a first end of capacitor 48, and a first end of resistor 54 are coupled to ground (a ground terminal 78). A second end of capacitor 48 is coupled to a first end of resistor 50. A second end of resistor 50 is coupled to a second end of resistor 54, and a first end of switch 37. A second end of switch 37 is coupled to an anode of LED 35. A cathode of LED 35 is coupled to ground.

The second end of capacitor 48 is also coupled to a negative input to comparator 40, and a first end of resistor 46. A second end of resistor 46 is coupled to VCC (a power level) and a first end of resistor of 44. VCC is preferably coupled to a positive terminal 74 of a battery 28 or other circuit which provides a stable voltage signal. A second end of resistor 42 is coupled to a second end of resistor 44 and a positive terminal of comparator 40. An output of comparator 40 is coupled to an input 59 of voltage tripler 60. An output 61 of voltage tripler 60 is coupled to a first end of resistor 62. A second end of resistor 62 is coupled to battery switch 22. Resistor 54 bleeds noise associated with switch 37 to ground, and resistor 50 and capacitor 48 filter noise from being received by the negative terminal of comparator 40. Alternatively, the voltage divider may be replaced by a 2.5 volt zener diode.

Battery switch 22 includes an n-channel or a p-channel MOSFET 64. Preferably, MOSFET 64 is a Milwaukee Electric Tool Co. 1 mΩ power MOSFET module. A second end of resistor 62 is coupled to a gate 66 of MOSFET 64. A drain 68 of MOSFET 64 is coupled to a positive terminal 74 of battery 26. Load 30 is representative of the electrical load of the vehicle and is coupled between ground terminal 78 and positive terminal 74. Motor starter 31 is also coupled between terminals 74 and 78. A source 70 of MOSFET 64 is coupled to a positive terminal 72 of battery 26. Negative terminals 77 and 76 of batteries 26 and 28, respectively, are coupled to a ground terminal 78.

In operation, indicator 14, indicator switch 16 and driver circuit 18 provide both control operations and indicating operations for battery switch 22. When switch 37 is in an open state, the voltage at the negative terminal of comparator 40 is greater than the voltage provided by a voltage divider comprised of resistors 44 and 42 at the positive input of comparator 40. When the voltage at the negative terminal is less than the voltage at the positive terminal of comparator 40, comparator 40 provides a logic low at input 59 of voltage tripler 60.

When the operator of the vehicle, or an automatic battery back-up circuit (not shown) closes switch 37, current travels through resistors 46 and 50 through LED 35. LED 35 emits light in response to the current. The voltage at the negative input of comparator 40 is decreased to approximately 2.3 V when switch 37 is closed. The 2.3 V at the negative terminal of comparator 40 is less than the threshold provided by resistors 44 and 42 at the positive terminal of comparator 40 with respect to the battery voltage under load. In response to this condition, comparator 40 provides a logic high at input 59. Preferably, the logic high is the level of voltage provided by positive terminal 74 of battery 28 such as VCC or 12 V. Alternatively, the signal from switch 37 may be provided to a computer or other control circuitry in vehicle 12 for providing control operations and warnings.

Voltage tripler 60 triples the voltage provided at input 59 and provides a tripled voltage at input 61. Conventional voltage triplers utilize capacitors and rectifiers to raise an input voltage to a higher voltage. Voltage tripler 60 is preferably a transformerless voltage tripler such as the voltage tripler described in U.S. Pat. No. 5,316,868. When the voltage at input 59 is near zero, voltage tripler 60 provides a near zero volt signal at output 61. The zero volt signal at output 61 biases MOSFET 64 off or to a non-conducting state so battery 26 is prevented from providing power to load 30.

When comparator 40 provides a logic high (preferably the voltage level at positive terminal 24), voltage tripler 60 provides a voltage tripled signal at output 61 so that MOSFET 64 is biased ON even under extreme conditions. For example, voltage tripler provides the necessary voltage (10 V above VCC) even when the voltage level at terminal 74 is dropped to 7 volts when current is provided to starter 31. Voltage tripler 60 advantageously includes a zener latch (not shown) which prevents excessive voltages at output 61 (more than 20 V over the voltage at positive terminal 74).

When MOSFET 64 is biased ON, there is very little impedance between drain 68 and source 70. Preferably, positive terminal 74 is essentially coupled to positive terminal 72 when the voltage tripled signal is provided to gate 66 of MOSFET 64. Preferably, MOSFET 64 is biased ON by a voltage of 10 V above the voltage at drain 68. Preferably, MOSFET 64 reaches saturation when gate 66 has a voltage 20 V above the voltage at drain 68. Thus, voltage tripler 60 is appropriately zener latched so that it does not provide more than a 20 volt difference between positive terminal 74 and gate 66.

Alternatively, LED 35 and switch 37 may be configured in parallel or in various arrangements and provide logic highs or logic lows to the negative or positive terminals of comparator 40. Comparator 40 advantageously allows active low and active high control circuits to be more easily designed. Also, MOSFET 64 may be replaced by the type of MOSFET which conducts when a negative bias is provided between gate 66 and drain 68.

It is understood that, while the detailed drawing and specific examples given describe preferred exemplary embodiments of the present invention, they are for the purpose of illustration only. The apparatus of the invention is not limited to the precise details and conditions disclosed. For example, although specific circuit components and values are given, the circuits may utilized with other devices. For example, although the MOSFET and comparator respond to active high signals, the circuit could be designed for active low signals. Also, although a voltage tripler is used other devices for providing a bias voltage may be utilized. Various changes can be made to the details disclosed without departing from the spirit of the invention which is defined by the following claims.

What is claimed is:

1. A dual battery system for an automobile, comprising:
   a first battery having a first positive terminal and a second negative terminal;
   a second battery having a second positive terminal and a second negative terminal, the second negative terminal electrically communicating with the first negative terminal;
   a transistor having a gate, a drain coupled to the first positive terminal, and a source coupled to the second positive terminal;
   an indicator; and a driver circuit responsive to a first state of the indicator for providing a first control signal to the gate and to a second state of the indicator for providing a second control signal to the gate.

2. The dual battery system of claim 1 further comprising an indicator switch, wherein the indicator emits light in response to the indicator switch being in the first position.

3. The dual battery system of claim 2 wherein the indicator switch is controlled by an automatic battery circuit.

4. The dual battery system of claim 1 wherein the indicator includes an input electrically coupled to the driver circuit and wherein in the first state a first voltage level is present at the input and in the second state a second voltage level is present at the input.

5. The dual battery system of claim 4 wherein the indicator comprises one of the group comprising a light emitting diode and an incandescent lamp.

6. The dual battery system of claim 4 wherein the indicator further comprises a switch for selectively coupling the indicator to the input.

* * * * *